(12) United States Patent
Kakutani

(10) Patent No.: US 9,247,104 B2
(45) Date of Patent: Jan. 26, 2016

(54) PRINTING APPARATUS, PRINTING METHOD, PROGRAM, AND IMAGE PROCESSING APPARATUS

(71) Applicant: SEIKO EPSON CORPORATION, Tokyo (JP)

(72) Inventor: Toshiaki Kakutani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/295,755

(22) Filed: Jun. 4, 2014

(65) Prior Publication Data

US 2014/0362416 A1 Dec. 11, 2014

(30) Foreign Application Priority Data

Jun. 5, 2013 (JP) ................... 2013-118609

(51) Int. Cl.
*G06K 15/02* (2006.01)
*H04N 1/405* (2006.01)
*H04N 1/60* (2006.01)

(52) U.S. Cl.
CPC ..................... *H04N 1/405* (2013.01)

(58) Field of Classification Search
USPC ............... 358/3.24, 1.9, 3.03, 3.06; 382/252; 714/770
See application file for complete search history.

(56) References Cited

U.S. PATENT DOCUMENTS

| | | | | |
|---|---|---|---|---|
| 5,530,561 A * | 6/1996 | Shimazaki | | 358/3.03 |
| 5,553,166 A | 9/1996 | Kakutani | | |
| 6,474,768 B1 * | 11/2002 | Yano et al. | | 347/19 |
| 7,965,419 B2 | 6/2011 | Kakutani | | |
| 7,995,243 B2 * | 8/2011 | Sakaue | | 358/3.06 |
| 8,416,457 B2 | 4/2013 | Kakutani | | |
| 2008/0285085 A1 * | 11/2008 | Li et al. | | 358/3.06 |
| 2012/0243012 A1 | 9/2012 | Kakutani | | |
| 2012/0243013 A1 | 9/2012 | Kakutani | | |

FOREIGN PATENT DOCUMENTS

| | | |
|---|---|---|
| EP | 1798951 A1 | 6/2007 |
| JP | 3360391 B2 | 12/2002 |
| JP | 2007-015359 A | 1/2007 |
| JP | 2007-166622 A | 6/2007 |
| JP | 2011-066594 A | 3/2011 |
| JP | 2011-120134 A | 6/2011 |
| JP | 2012-204967 A | 10/2012 |
| JP | 2012-204968 A | 10/2012 |

* cited by examiner

Primary Examiner — Quang N Vo
(74) Attorney, Agent, or Firm — Global IP Counselors, LLP

(57) ABSTRACT

A printing apparatus includes a dot data generating section configured to: compare a first threshold which is aligned with a dither mask and a corresponding gradation value which corresponds with the image data which is input; generate the dot data by determining that dots are to be formed in a case where it is determined that the corresponding gradation value exceeds the first threshold and generate the dot data by determining the forming of dots due to application of an error diffusion method by comparing correction data, where error diffusion in the image data is complete, and a second threshold in a case where it is determined that the corresponding gradation value does not exceed the first threshold as a result of the comparing; and diffuse errors, which occur as a result of generating the dot data, to pixels in a predetermined range in the vicinity in both cases.

11 Claims, 8 Drawing Sheets

PRINTING APPARATUS, PRINTING METHOD, PROGRAM, AND IMAGE PROCESSING APPARATUS

CROSS-REFERENCE TO RELATED APPLICATIONS

This application claims priority to Japanese Patent Application No. 2013-118609 filed on Jun. 5, 2013. The entire disclosure of Japanese Patent Application No. 2013-118609 is hereby incorporated herein by reference.

BACKGROUND

1. Technical Field

The present invention relates to a technique for processing an image using image data and to a technique for printing an image.

2. Related Art

As a halftone process where image data with numerous gradations is printed using dot data with a smaller number of gradations, there are known an error diffusion method where density errors are distributed in pixels in the vicinity in a case of converting the number of gradations, an ordered dither method where dot data is generated using a dither mask where threshold arrangement is carried out with excellent dispersibility, and the like. In a case of using a dither mask where a blue noise characteristic is applied or using a Bayer dither mask, the dispersibility of dot arrangement is excellent and the reproducibility of an image is superior with data with comparatively few changes in gradation has a two dimensional spread. In addition, the ordered dither method has an advantage in that it is possible to control forming of dots by applying a specific characteristic to the arrangement of thresholds in the dither mask.

For example, in a method which is illustrated in Japanese Unexamined Patent Application Publication No. 2007-15359 described later, by independently creating a dither mask which is used in determining the forming of dots during forward movement and a dither mask which is used in determining the forming of dots during backward movement in a case where bidirectional printing is performed and applying a blue noise characteristic to each of the dither masks, printing is possible with little reduction in image quality with regard to deviation in positions for forming dots which are the printing positions in both dither masks.

SUMMARY

However, there is a problem in that reproducing line drawings such as fine lines which are drawn with low density data is unstable in a method where dot data is generated using a dither mask even with the ordered dither method. Fine lines with low density data are expressed by arranging dots at appropriate intervals, but when a blue noise mask is applied to the image data where there are fine lines, there is a phenomenon where lines are broken due to the dot intervals not being equally spaced and the dot intervals having large gaps in places. On the other hand, when a dither mask which has a regular pattern such as a Bayer dither is applied, a phenomenon is observed where the dot intervals considerably change according to the angle and position of the line drawings. In particular, in a case where the lines do not pass through pixel positions which correspond to low thresholds which are regularly arranged in the dither mask, there are problems in that dots which correspond to the lines are hardly formed and the lines disappear. These problems are particularly remarkable when reproducing CAD data which is based on line drawings.

On the other hand, in a case where the error diffusion method is used, it is possible to obtain comparatively better dot rows with regard to the line drawings by adjusting the values of the thresholds to values which correspond to the image data and correcting the range of the error diffusion as shown in Japanese Patent No. 3360391. Therefore, a method is considered where the error diffusion method is applied in a low gradation area where reduction in reproducibility of fine lines is a problem, and the dither method is applied in medium or high gradation areas where reduction in image quality or the like with regard to deviation of the positions for forming dots is a problem. A method of switching smoothly between halftone methods which are different in this manner is realized in Japanese Unexamined Patent Application Publication No. 2011-66594 described above. This method is extremely effective, but there is a problem in that since the ratio of the contribution of the error diffusion method and dither method is indirectly controlled according to threshold settings in the error diffusion, it is necessary to repeat the process of actually measuring the ratio of the dots which are generated with dither compatibility for each gradation value and providing feedback to the threshold settings until the desired result is obtained in order to optimize the settings.

Although various types of halftone methods are proposed in the prior art, a method is yet to be found where the ratio of the contribution of the error diffusion method is easily optimized while taking advantage of the ordered dither method where it is possible to impart various characteristics to the dot data as described above. In addition, in the image processing and printing in the prior art, there is also a desire to reduce the size of the apparatuses, reduce the cost, save resources, increase ease of manufacturing, improve usability, and the like.

The present invention is created in order to solve at least some of the problems described above and it is possible to realize the present invention as the following aspects.

(1) As a first aspect of the present invention, there is provided a printing apparatus which prints an image based on image data. The printing apparatus is provided with an input section where the image data is input, a dot data generating section which generates dot data, which represents whether or not dots are formed, based on the image data, and a print section which performs printing of the image using the dot data which is generated. Here, the dot data generating section may compare a first threshold which is aligned with a dither mask and a corresponding gradation value which corresponds with the image data which is input, may generate the dot data by determining that dots are to be formed in a case where it is determined that the corresponding gradation value exceeds the first threshold and generate the dot data due to application of an error diffusion method by determining the forming of dots by comparing correction data, where error diffusion in the image data is complete, and a second threshold in a case where it is determined that the corresponding gradation value does not exceed the first threshold as a result of the comparing, and may diffuse errors, which occur as a result of generating the dot data, to pixels in a predetermined range in the vicinity in both of these cases.

The printing apparatus generates dot data by determining that dots are formed without any changes in a case where the corresponding gradation value exceeds the first threshold and determining that dots are formed using the error diffusion method in a case where the corresponding gradation value does not exceed the first threshold. In both of these cases, the errors which occur as a result of generating the dot data are distributed to predetermined pixels in the vicinity. Accordingly, (A) when the corresponding gradation value corresponds to a value which is smaller than the original image data, the ratio of dots, where it is determined that the dots are to be formed by determining using the first threshold which is aligned with the dither mask, is reduced and it is possible to form this part using the error diffusion method, (B) when the corresponding gradation value is close to the original image data, the ratio of the dots, where it is determined that the dots are to be formed by determining using the first threshold which is aligned with the dither mask, is increased and it is possible for the dots to be formed substantially using the dither method and the forming of dots according to the characteristics of the dither mask is possible.

As a result, it is possible to adjust the ratio of the dots which are formed according to the dither method and the ratio of the dots which are formed according to the error diffusion method with a high degree of freedom. For example, when the corresponding gradation value is set to be smaller with regard to the original image data, it is possible to compensate for the necessary dots with regard to fine lines and edges using the error diffusion method. On the other hand, when the corresponding gradation value is set to be close to the original image data, generating of dots with the intention of taking advantage of the characteristics of the dither mask is possible.

(2) In the printing apparatus, the corresponding gradation value may be a value which is determined by multiplying the gradation value of the image data with a predetermined coefficient. In the printing apparatus, it is possible to easily adjust whether to strengthen either of the states of (A) and (B) described above by adjusting the value of the coefficient in a range of 0 to 1.0.

(3) In the printing apparatus described above, the coefficient may be determined according to the gradation value of the image data which is input. In the printing apparatus, it is possible to change whether to strengthen either of the states of (A) and (B) described above according to the gradation value of the image data. As a result, for example, when the corresponding gradation value is smaller with regard to the original image data in a low gradation area, it is possible to compensate for the necessary dots with regard to fine lines and edges using the error diffusion method. On the other hand, when the corresponding gradation value is close to the original image data in a high gradation area, generating of dots which takes advantage of the characteristics of the dither mask is possible.

(4) In the printing apparatus, the coefficient may be a value in the vicinity of 0 when the gradation value of the image data which is input is less than a first gradation value, may gradually increase according to the gradation value of the image data when the gradation value of the image data which is input is equal to or more than the first gradation value and less than the second gradation value, and may be a value of 1.0 when the gradation value of the image data which is input is equal to or more than the second gradation value. In the printing apparatus, it is possible to gradually change from the forming of dots which are compatible with the error diffusion method to the forming of dots substantially according to the dither method while moving from a low gradation area to a high gradation area.

(5) In the printing apparatus described above, the coefficient may be a value of 1.0 when the gradation value of the image data which is input is less than a first gradation value, may gradually decrease according to the gradation value of the image data when the gradation value of the image data which is input is equal to or more than the first gradation value and less than the second gradation value, and may be a value in the vicinity of 0 when the gradation value of the image data which is input is equal to or more than the second gradation value. In the printing apparatus, it is possible to change gradually from the forming of dots which are substantially compatible with the dither method to the forming of dots according to the error diffusion method while moving from a low gradation area to a high gradation area.

(6) The alignment of the thresholds in the dither mask which is used in the printing apparatus may be an alignment where the spatial frequency, with which the formed dots are provided, is provided with either of a blue noise characteristic or a green noise characteristic. In the printing apparatus, it is possible for the arrangement of the dots which are formed using the dither method to be close to the error diffusion method when the blue noise characteristic is set. In addition, it is possible for the arrangement of the dots which are formed using the dither method to be close to the characteristic of the halftone dot arrangement when the green noise characteristic is set.

(7) In the printing apparatus, the gradation value may be treated as the corresponding gradation value in the comparing of the gradation value of the input data and the first threshold by modifying the first threshold which is aligned with the dither mask. In this manner, it is sufficient if the first threshold which is modified is used instead of determining the corresponding gradation value which corresponds to the image data which is input. Furthermore, it is possible to modify the first threshold in advance and it is possible to further simplify the processing.

(8) As a second aspect of the present invention, there is provided a printing method where an image is printed based on image data. The printing method includes inputting the image data; comparing a first threshold which is aligned with a dither mask and a corresponding gradation value which corresponds with the image data which is input when dot data, which represents whether or not dots are formed, is generated from the image data; generating the dot data by determining that dots are to be formed in a case where it is determined that the corresponding gradation value exceeds the first threshold and generating the dot data due to application of an error diffusion method by determining the forming of dots by comparing correction data, where error diffusion in the image data is complete, and a second threshold in a case where it is determined that the corresponding gradation value does not exceed the first threshold as a result of the comparing; diffusing errors, which occur as a result of generating the dot data, to pixels in a predetermined range in the vicinity in both of these cases; and performing printing of the image using the dot data which is generated.

In the printing method, in a similar manner to the printing apparatus of the first aspect, dot data is generated by determining that dots are formed without any changes in a case where the corresponding gradation value exceeds the first threshold and determining that dots are formed using the error diffusion method in a case where the corresponding gradation value does not exceed the first threshold. In both of these cases, the same effects as the first aspect are achieved since the errors which occur as a result of generating the dot data are distributed to predetermined pixels in the vicinity.

(9) As a third aspect of the present invention, there is provided a program which prints an image based on image data. The program, which realizes the following functions through a computer includes inputting the image data; comparing a first threshold which is aligned with a dither mask and a corresponding gradation value which corresponds with the image data which is input when dot data, which represents whether or not dots are formed, is generated from the image data; generating the dot data by determining that dots are to be formed in a case where it is determined that the corresponding gradation value exceeds the first threshold and generating the dot data due to application of an error diffusion method by determining the forming of dots by comparing correction data, where error diffusion in the image data is complete, and a second threshold in a case where it is determined that the corresponding gradation value does not exceed the first threshold as a result of the comparing; diffusing errors, which occur as a result of generating the dot data, to pixels in a predetermined range in the vicinity in both of these cases; and performing printing of the image using the dot data which is generated.

In the same manner as the first and second aspects, the program also generates dot data by determining that dots are formed without any changes in a case where the corresponding gradation value exceeds the first threshold and determining that dots are formed using the error diffusion method in a case where the corresponding gradation value does not exceed the first threshold. In both of these cases, since the errors which occur as a result of generating the dot data are distributed to predetermined pixels in the vicinity, it is possible to achieve the same operational effects as the first and second aspects in the computer where the program is executed.

(10) As a fourth aspect of the present invention, there is provided an image data processing apparatus which processes image data. The image processing apparatus is provided with an input section where the image data is input and a dot data generating section which generates dot data, which represents whether or not dots are formed, from the image data which is input. Here, the dot data generating section compares a first threshold which is aligned with a dither mask and a corresponding gradation value which corresponds with the image data which is input, generates the dot data by determining that dots are to be formed in a case where it is determined that the corresponding gradation value exceeds the first threshold and generates the dot data due to application of an error diffusion method by determining the forming of dots by comparing correction data, where error diffusion in the image data is complete; and a second threshold in a case where it is determined that the corresponding gradation value does not exceed the first threshold as a result of the comparing, and diffuses errors, which occur as a result of generating the dot data, to pixels in a predetermined range in the vicinity in both of these cases.

In the same manner as the first and third aspects, the image processing apparatus generates dot data by determining that dots are formed without any changes in a case where the corresponding gradation value exceeds the first threshold, and determining that dots are formed using the error diffusion method in a case where the corresponding gradation value does not exceed the first threshold. In both of these cases, since the errors which occur as a result of generating the dot data are distributed to predetermined pixels in the vicinity, it is possible to generate the dot data in the same manner as the first aspect in the image processing.

(11) As a fifth aspect of the present invention, there is provided a printing apparatus which prints an image based on image data. The printing apparatus is provided with an input section where the image data is input, a first dot data generating section which generates dot data where whether or not dots are formed is provisionally determined by comparing each of thresholds in a dither mask where a plurality of thresholds are stored and a corresponding gradation value where the gradation value of the image data is multiplied with a predetermined coefficient, a second dot data generating section which determines that dots are formed without any changes in a case where the provisional dot data shows a result where it is determined that dots are to be formed and determines whether or not dots are formed due to application of an error diffusion method to the image data in a case where the provisional dot data shows a result where it is determined that dots are not to be formed, an error diffusion section which diffuses errors, which occur as a result of generating the dot data, to pixels in a predetermined range in the vicinity in a case where the dot data is generated according to either of the first or second dot data generation sections, and a printing section which performs printing of the image using the dot data which is generated.

The printing apparatus diffuses errors, which occur as a result of generating the dot data, to pixels in a predetermined range in the vicinity even in cases where dot data is generated by either of the first dot data generating section or the second dot data generating section. Accordingly, in a case where there is a shortage in the dots which are generated by the first dot data generating section according to the setting of the corresponding gradation value, the insufficient dots are generated by the second dot data generating section.

Not all of the plurality of constituent elements of each of the aspects of the present invention described above are essential, and it is possible to change, remove, or replace some of the constituent components of the plurality of constituent components with new and different constituent components, or remove some of the limited content of the constituent components of the plurality of constituent components as appropriate in order to solve some or all of the problems described above or in order to achieve some or all of the effects which are described in the present specification. In addition, in order to solve some or all of the problems described above or in order to achieve some or all of the effects which are described in the present specification, it is possible for some or all of the technical characteristics which are included in one aspect of the present invention described above to be an independent aspect of the present invention by being combined with some or all of the technical characteristics which are included in other aspects of the present invention described above.

It is also possible for the present invention to be realized in various aspects other than a printing apparatus or an image data processing apparatus. For example, it is possible to realize a method for manufacturing a printing apparatus or a method for controlling a printing apparatus in a format such as a computer program for realizing the control method or a permanent recording medium where the computer program is recorded.

BRIEF DESCRIPTION OF THE DRAWINGS

Referring now to the attached drawings which form a part of this original disclosure.

DETAILED DESCRIPTION OF EXEMPLARY EMBODIMENTS

A. First Embodiment

A first embodiment of the present invention will be described.

A-1. Apparatus Configuration

Figure 1:
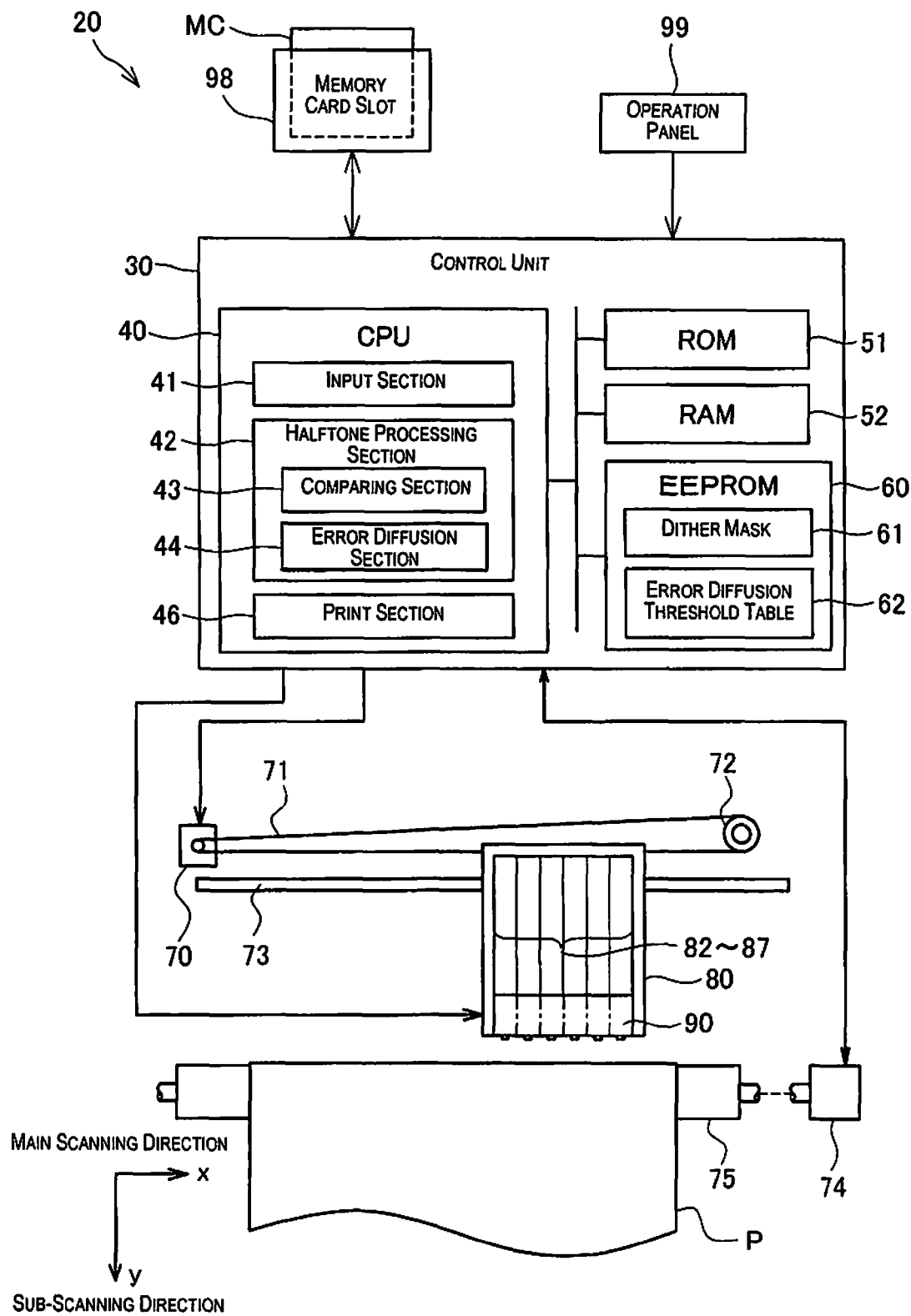
FIG. 1 is a schematic configuration diagram of a printer 20 as a first embodiment of the present invention.

FIG. 1 is a schematic configuration diagram of a printer 20 which is the first embodiment of a printing apparatus of the present invention. The printer 20 is a serial ink jet printer which performs bidirectional printing, and the printer 20 is configured by a mechanism which transports a print medium P using a sheet feeding motor 74, a mechanism which moves a carriage 80 back and forth in the axial direction of a platen 75 using a carriage motor 70, a mechanism where discharging of ink and forming of dots are performed by driving a print head 90 which is mounted in the carriage 80, and a control unit 30 which governs the exchange of signals between the sheet feeding motor 74, the carriage motor 70, the print head 90, and an operation panel 99, as shown in the diagram.

The mechanism which moves the carriage 80 back and forth in the axial direction of the platen 75 is configured from a sliding shaft 73 which extends in parallel with the axis of the platen 75 and which holds the carriage 80 so that the carriage 80 is able to slide, a pulley 72 which is provided to stretch an endless driving belt 71 between the pulley 72 and the carriage motor 70, and the like.

The carriage 80 is mounted with ink cartridges 82 to 87 for color inks where each of cyan ink C, magenta ink M, yellow ink Y, black ink K, light cyan ink Lc, and light magenta ink Lm are stored as color inks. Nozzle rows which correspond to color inks of each of the colors described above are formed in the print head 90 in the lower section of the carriage 80. When the ink cartridges 82 to 87 are mounted into the carriage 80 from above, it is possible to supply ink from each of the cartridges to the print head 90.

The control unit 30 is configured by connecting a CPU 40, a ROM 51, a RAM 52, and an EEPROM 60 to one another using a bus. The control unit 30 also functions as an input section 41, a halftone processing section 42, and a print section 46 in addition to controlling the overall operations of the printer 20 by programs which are stored in the ROM 51 or the EEPROM 60 being loaded into and executed by the RAM 52. The functions of the halftone processing section 42 include functions as a comparing section 43 and an error diffusion section 44. The details of these functional sections will be described later with reference to the flow charts of FIG. 2 and FIG. 3 and the characteristic diagram of the coefficient k in FIG. 4.

A dither mask 61 and an error diffusion threshold table 62 are stored in the EEPROM 60. The dither mask 61 is used in a halftone process which will be described later and has a size of 256 horizontally (in the main scanning direction) by 64 vertically (in the sub-scanning direction) as exemplified in a portion of FIG. 5. A plurality of thresholds THn_d which are equivalent to a first threshold are aligned in the dither mask 61. The first threshold THn_d (which is simply referred to below as threshold THn_d) is a value of 1 to 255 in the present embodiment. Each of the thresholds THn_d is arranged such that the spatial frequency of the dots which are formed using a comparison with the threshold is a so-called blue noise characteristic.

Figure 6:
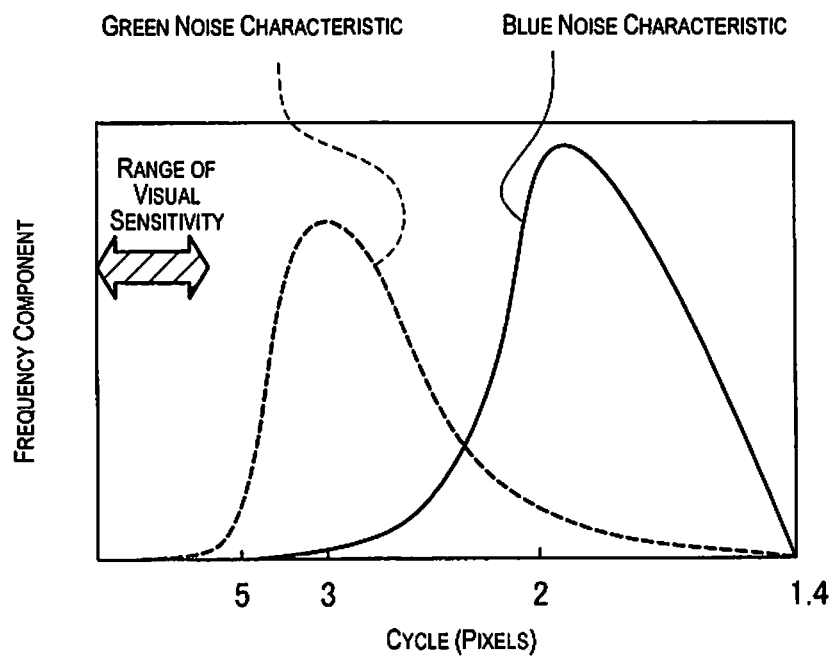
FIG. 6 is an explanatory diagram exemplifying noise characteristics which are provided in the dither mask 61 which is used in an embodiment.

FIG. 6 is an explanatory diagram exemplifying noise characteristics which are provided in the dither mask 61. The spatial frequency characteristics of the threshold, which are set for each of the pixels of the dither mask which has a blue noise characteristic and a green noise characteristic, are conceptually exemplified in the diagram. The blue noise characteristic in the dither mask has the largest spatial component in a high frequency region where the length of one cycle is close to 2 pixels. This has the meaning that the storage positions of the thresholds are adjusted such that the largest frequency components are generated in the high frequency region in consideration of characteristics of human sight where sensitivity is low in the high frequency region. It is possible to obtain an image with superior dot dispersibility when dots are generated using the dither mask which is provided with the blue noise characteristic in this manner.

The green noise characteristic is also exemplified in FIG. 6 as a dashed curved line. As shown in the diagram, the green noise characteristic has the largest frequency component at a side where the frequency is slightly lower than the blue noise characteristic, and it is possible to obtain an excellent image where a sense of graininess is not perceived even with the green noise characteristic when the pixel size is sufficiently small. The dither mask 61 has predetermined spatial frequency characteristics such as the blue noise characteristic and the green noise characteristic.

Furthermore, the dither mask 61 has a predetermined characteristic for forming dots in the present embodiment. That is, a dot pattern of a dot group which is formed by forward movement of the carriage 80 in bidirectional printing, a dot pattern of a dot group which is formed by backward movement of the carriage 80 in bidirectional printing, and any dot pattern of all the dot groups which are a combination of these all have the blue noise characteristic. Such techniques are described in, for example, Japanese Unexamined Patent Application Publication No. 2007-15359 and Japanese Unexamined Patent Application Publication No. 2007-15359. Here, the dither mask 61 may be provided with the blue noise characteristic for each main scanning group which indicates whether dots are formed in any main scanning out of a plurality of times of main scanning of the carriage 80 in addition to or instead of for each group of back and forth movement described above.

Here, in a case where the spatial frequency of the dots has the blue noise characteristic or the green noise characteristic, the dots which are formed have excellent dispersibility. Alternatively, it is also possible to determine whether dispersibility of the dots is excellent in a case where each of the spatial frequency distributions of the thresholds of the dither mask, which is set for pixels which belong to each of the plurality of groups, and the spatial frequency distribution of the print image have a positive correlation coefficient with each other, desirably, a correlation coefficient of equal to or more than 0.7.

The error diffusion threshold table 62 which is stored in the EEPROM 60 is a table for storing a second threshold THe which is used in determining ON/OFF of the dots in the error diffusion method. In the first embodiment, the second threshold THe is fixed at a value (the central value in the gradation range) which is used in normal error diffusion as will be described later.

The control unit 30 is connected with a memory card slot 98 and it is possible to read in and input image data ORG from a memory card MC which is inserted in the memory card slot 98. In the present embodiment, the image data ORG which is input from the memory card MC is data which is formed from color components of the three colors of red (R), green (G), and blue (B).

The printer 20 which has the hardware configuration described above moves the print head 90 back and forth in the main scanning direction with regard to the print medium P by driving the carriage motor 70 and also moves the print medium P in the sub-scanning direction by driving the sheet feeding motor 74. The control unit 30 forms ink dots of appropriate colors at appropriate positions on the print medium P by driving the nozzles at an appropriate timing based on the print data by combining movement of the back and forth movement of the carriage 80 (in the main scanning) and movement of the sheet feeding of the print medium (in the sub-scanning). By doing so, it is possible for the printer 20 to print color images which are input from the memory card MC onto the print medium P.

A-2. Printing Process

Figure 2:
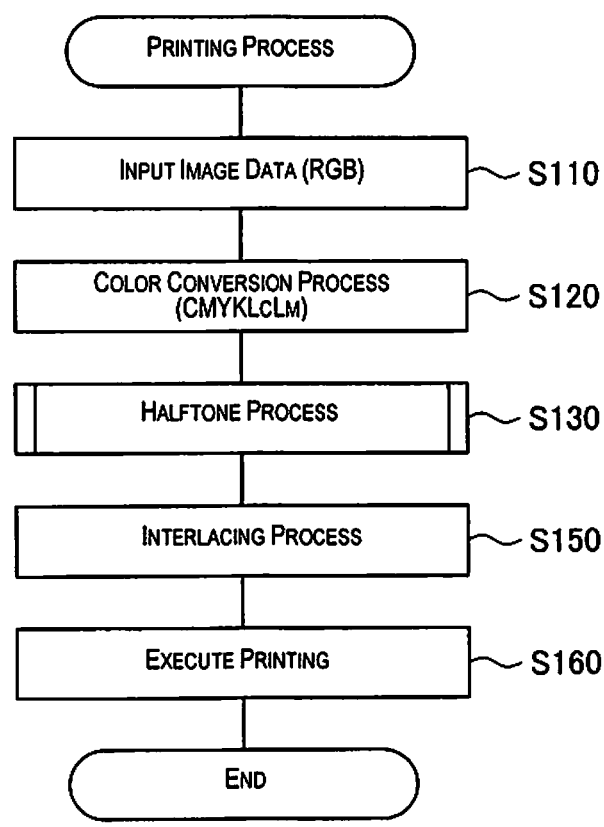
FIG. 2 is a flow chart illustrating a flow of a printing process of the printer 20.

A printing process of the printer 20 will be described. FIG. 2 is a flow chart illustrating a flow of a printing process of the printer 20. Here, the printing process is started by the user performing an operation of instructing a predetermined image, which is stored in the memory card MC, to be printed using the operation panel 99 and the like. When the printing process starts, the CPU 40 initially reads in and inputs the image data ORG, which is the print target in RGB format, from the memory card MC via the memory card slot 98 as the process of the input section 41 (step S110).

When the image data ORG is input, the CPU 40 color converts the RGB format of the image data ORG to a CMYKLcLm format by referring to a look up table (which is not shown in the diagram) which is stored in the EEPROM 60 (step S120). Here, resolution conversion may be performed as necessary before or after the color conversion process.

When the color conversion process is performed, the CPU 40 performs a halftone process where the image data is converted to dot data where ON/OFF of the dots of each of the colors is determined for each of the pixels as the process of the halftone processing section 42 (step S130). The details of the halftone process described here will be described later. Here, in the present specification, the "halftone process" has a general meaning of gradation number conversion (reduction) processes which include multi-level processing such as ON/OFF of large dots and small dots, or the like without being limited to a binarization process of ON/OFF of dots. In addition, the image data which is subjected to step S130 may be image data where image processing such as a resolution conversion process or a smoothing process is carried out.

When the halftone process is performed, the CPU 40 performs an interlacing process where the image data is rearranged into dot pattern data which is to be printed in a single main scanning unit in accordance with the nozzle arrangement of the printer 20, the sheet feeding amount, and the like (step S150). When the interlacing process is performed, the CPU 40 executes printing by driving the print head 90, the carriage motor 70, the motor 74, and the like as the processes of the print section 46 (step S160).

A-3. Details of Halftone Process

The details of the halftone process (step S130) described above will be described using FIG. 3. As shown in the diagram, when the process is started, the CPU 40 initially performs the following processes (steps S131 to S140) on the image data where the color conversion process is performed in step S120 with predetermined pixels as target pixels. The target pixel position is moved one pixel at a time in the main scanning direction (x direction) each time the following process is repeated starting from the origin point (at the upper left) of the image. When the target pixel position reaches the right edge of the image in the main scanning direction, the pixel position is moved once in the sub-scanning direction (y direction) and is moved once again from the left edge of the image in the x direction in the main scanning direction. In the following description, the coordinate data of the target pixel position is represented as n(x, y), but the coordinate data will be written directly as (x, y) when using subscript which indicates the target pixel position.

Figure 4:
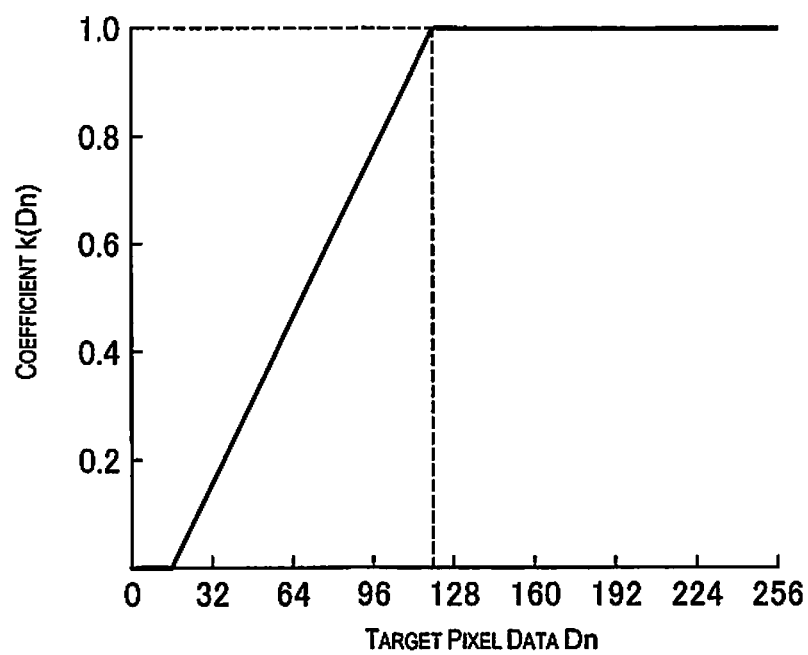
FIG. 4 is a graph illustrating a relationship between target pixel data Dn and a coefficient k(Dn) in the first embodiment.

The CPU 40 initially acquires coordinate data n(x, y) of the target pixel position and the target pixel data Dn in relation to the target pixels and performs a process of determining a value Dn' where the gradation value of the target pixel data Dn is multiplied with a predetermined coefficient k(Dn) (0<k(Dn)≤1) (step S131). Since the data which is calculated in this manner is a gradation value (a corresponding gradation value) which corresponds due to being associated with the gradation value of the target pixel data Dn, the data which is calculated is also referred to below associated data Dn' (Dn' is equal to k(Dn)×Dn). An example of the coefficient k(Dn) which is used in the present embodiment is shown in FIG. 4.

As shown in the diagram, the coefficient k(Dn) is given as a function of the target pixel data Dn. In the first embodiment, the coefficient k(Dn) is a value of 0 when the target pixel data Dn is a value of less than 16, the coefficient k(Dn) increases gradually in comparison with the target pixel data Dn when the target pixel data Dn is equal to or more than a value of 16 and less than 120, and the coefficient k(Dn) is a value of 1.0 when the target pixel data Dn is equal to or more than a value of 120. The associated data Dn' is used in determining (determining the provisional dither) in step S134 which will be described later. A point where the coefficient k(Dn) which is a value of 0 starts to increase gradually (where the target pixel data Dn is a value of 16 in the present embodiment) is referred to as a first inflection point, and a point where the coefficient k(Dn) which is gradually increased is the maximum value (of 1.0 in the present embodiment) and then held at the same value (where the target pixel data Dn is a value of 120 in the present embodiment) is referred to as a second inflection point. The reason for using the associated data Dn' in the process of the provisional dither in place of the target pixel data Dn will be described later.

In the present specification, in a case of referring to values such as the coefficient k(Dn), the values may include value in a range where it is in essence not possible to recognize a difference in terms of generating the dots. For example, it is not necessary for the values of 0 and 1.0 described above to be exactly values of 0 or 1.0, and values in the vicinity of each of these values (for example, values of up to ±10%) may be included. In addition, it is sufficient if the coefficient k(Dn) is in essence gradually increased from the first inflection point to the second inflection point, and slight variations, for example, variations of up to approximately −10%, may occur during the gradual increasing. This point is the same for the examples of FIG. 9 and FIG. 10 which will be described later.

Subsequently, the CPU 40 adds a diffused error Edn, which is stored in an error buffer which is prepared separately, to the gradation value of the target pixel data Dn (step S132). The diffused error Edn is calculated in step S139 described later. The value where the diffused error Edn is added to the gradation value of the target pixel data Dn is also referred to as correction data.

The two processes described above (steps S131 and S132) are equivalent to processes of preparing the necessary data for determining of the provisional dither (step S134) which will be described later and the error diffusion process (steps S136 to S139). When the two processes described above are completed, the CPU 40 performs the provisional dither process as the process of the comparing section 43 (step S134). This process is a process where the magnitude relationship between the associated data Dn' which is calculated and the value of the first threshold THn_d at a position which corresponds to the coordinates (x, y) of the target pixel out of the plurality of thresholds (refer to FIG. 5) which configure the dither mask 61 which is stored in the EEPROM 60.

As a result of the provisional dither process, if the associated data Dn' for the target pixel is not equal to or more than the first threshold THn_d (step S134: NO), the correction data (Dn+Edn) which is determined in step S132 and the second threshold THe are compared (step S136). The second threshold THe is a value which is used in a normal error diffusion process, for example, an intermediate value of 127 if the gradation value of the image data is in a range of 0 to 255. As a result of the comparing in step S136, if the correction data (Dn+Edn) is equal to or more than the second threshold THe (step S136: YES), it is determined that the dot of the target pixel is ON (a dot is formed) (step S137), and if the gradation value of the correction data is less than the second threshold THe (step S136: NO), it is determined that the dot of the target pixel is OFF (a dot is not formed) (step S138).

On the other hand, in the provisional dither process in step S134, if the gradation value of the target pixel data Dn is equal to or more than the value of the first threshold THn_d (step S134: YES), it is determined that the dot is ON (step S537) in the same manner as in a case where the correction data (Dn+Edn) is equal to or more than the second threshold THe (step S136: YES).

When ON/OFF of the dots is determined in this manner, the CPU 40 calculates a binarization error En and the diffused error Edn (step S139) in both of these cases. The binarization error En is the difference between the correction data and a gradation value RSLT (here, a value of 255 or 0) which is realized as a result of ON/OFF of the dots. When expressed as a formula, the binarization error En may be expressed by the following formula (1).

$$En = \{Dn(x,y) + Edn(x,y)\} RSLT(255 \text{ or } 0) \quad (1)$$

Typically, the binarization error En is a positive value when dots are not formed and is a negative value when dots are formed.

Figure 7:
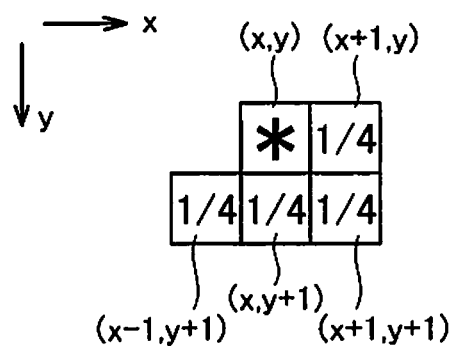
FIG. 7 is an explanatory diagram illustrating an example of an error diffusion range.

As a result, due to the process of the error diffusion which will be described later, it is difficult for dots to be formed in the pixels when dots are formed in the vicinity thereof and it is easy for dots to be formed in the pixels when the dots are not formed in the vicinity thereof due to the process of binarization. The error diffusion is a process where errors which are generated in the target pixels are distributed in the pixels in the vicinity by determining the diffused error Edn according to the following formula (2). The errors which are distributed are accumulated and added to the target pixel data Dn in step S132 described above. In the present embodiment, the binarization error En is distributed to four pixels which are pixels in the vicinity where ON/OFF of the dots is not yet determined as shown in FIG. 7. That is, distribution is carried out as the diffused error Edn at a ratio of 1/4 with regard to each of the pixel to the right of the target pixel, the pixel to the lower left of the target pixel, the pixel below the target pixel, and the pixel to the lower right of the target pixel. The diffused error Edn which is calculated in this manner is stored in the error buffer which is prepared in the RAM 52.

$$Edn(x+1, Y) = Edn(x+1, y) + En \times (1/4)$$

$$Edn(x-1, Y+1) = Edn(x-1, y+1) + En \times (1/4)$$

$$Edn(x, Y+1) = Edn(x, y+1) + En \times (1/4)$$

$$Edn(x+1, Y+1) = Edn(x+1, y+1) + En \times (1/4) \quad (2)$$

Here, the ratio of the distribution in the errors to the surrounding pixels is not limited to 1/4, and the weighting of the distribution may be changed to, for example, pixel positions such as 7/16, 5/16, 3/16, and 1/16 in this order. In addition, the errors may be diffused in an even wider range. Alternatively, the diffusion range may be changed according to the size of the target pixel data.

The processes of steps S136 to S139 are a halftone process using the error diffusion method and are executed as a process of the error diffusion section 44. In the examples described above, steps S136 to S139 were a binarization process where only ON/OFF of the dots is determined, but steps S136 to S139 may be performed as a multi-value process such as determining ON/OFF of large and small dots or large, medium, and small dots.

When the binarization error En and the diffused error Edn are calculated, the CPU 40 determines whether the processes described above are completed for all of the pixels (step S140) and repeats the processes of step S131 to S139 described above while incrementing the target pixel position (x, y) until the processes for all of the pixels are complete. In this manner, the halftone processing of step S130 is finished.

The principles of the halftone processing will be described later. In the present embodiment, a value of 0 is set as the coefficient k(Dn) when the target pixel data Dn is a value of less than 16. Accordingly, the associated data Dn' is a value of 0 in this gradation range. As a result, determining in the process of the provisional dither in step S134 is always "NO", steps 136 to S139 are executed, and ON/OFF of the dots is determined using the error diffusion method. In other words, the process is a fully error diffusion compatible process in this gradation range.

Figure 5:
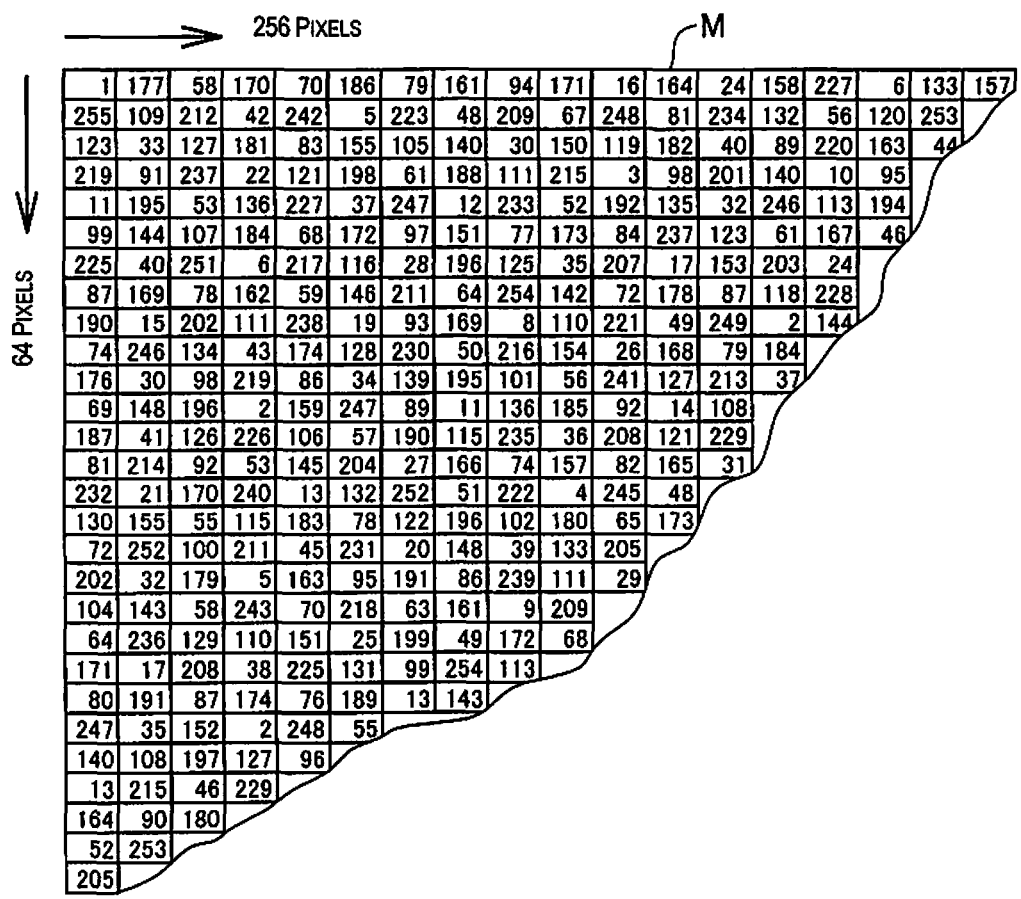
FIG. 5 is an explanatory diagram exemplifying a dither mask 61 which is used in an embodiment.

On the other hand, since the coefficient k(Dn) is a value of 1 in a gradation range where the target pixel data Dn is equal to or more than a value of 120, the associated data Dn' is equal to the target pixel data Dn. As a result, generating of the dots is substantially determined by the process of the provisional dither. In other words, the process is a substantially dither compatible process in this gradation range. Even when the target pixel data Dn is originally equal to or more than a value of 120 (for example, equal to or more than 128), the result of determining in step S134 may be "NO" since the value of the first threshold TH_d takes various values according to the pixel positions as shown in FIG. 5. In these cases, the result of determining of the second threshold The in step S136 is "YES" and dots are formed. That is, according to the printer 20 of the first embodiment, when the target pixel data Dn is equal to or more than a value of 120, ON/OFF of the dots is not always determined only using the dither method, and dots may be formed using error diffusion in addition to the dots using the dither.

When the target pixel data Dn is equal to or more than a value of 16 and less than 120, the coefficient k(Dn) is a value greater than 0 and less than 1.0. As a result, the lower the gradations in this gradation range, the more compatible with the error diffusion method, and the higher the gradations in this gradation range, the more compatible with the dither. That is, in the first embodiment, the dots are formed using the error diffusion method if the target pixel data Dn is small, and it is possible to smoothly switch to dither compatibility by increasing the gradation value from this state.

Figure 8:
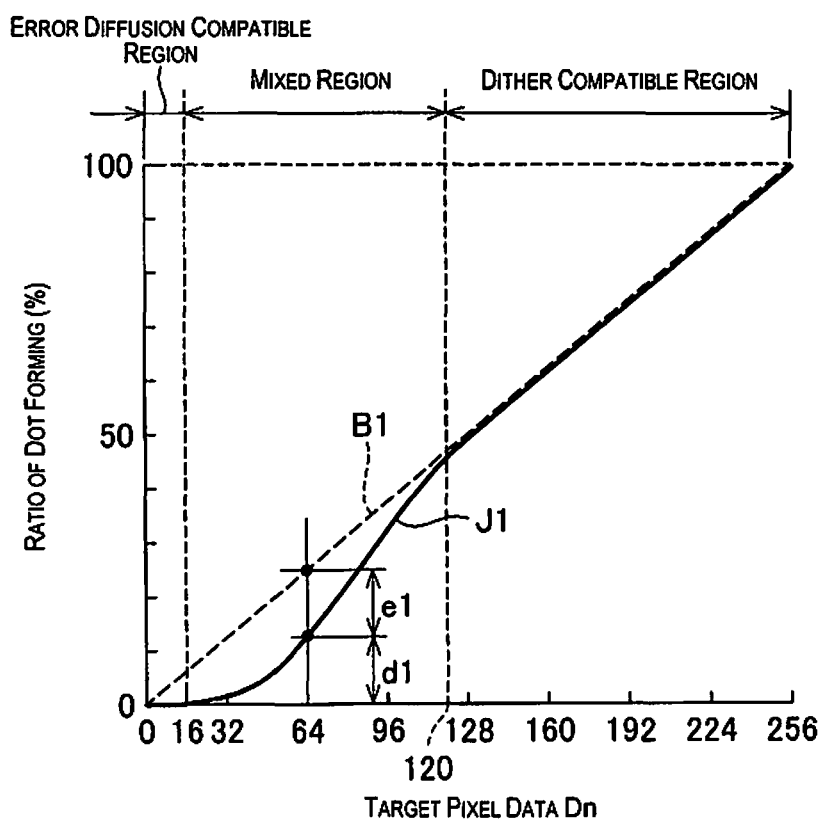
FIG. 8 is an explanatory diagram exemplifying an application range and ratio of the dither method and the error diffusion method in a case where the first embodiment is applied.

This point is further described using FIG. 8. FIG. 8 is an explanatory diagram illustrating the ratio at which dots are formed with regard to the target pixel data Dn. In FIG. 8, a dashed line B1 indicates a pixel ratio (0 to 100%) at which dots are to be finally generated in the present embodiment when the pixel data is Dn, and the dashed line B1 is proportional to the target pixel data Dn as shown in the diagram. When a normal dither mask, where special gamma control is not carried out and the thresholds increase linearly, is used as with the dither mask 61, the dashed line B1 matches with the dot generation rate in a simple ordered dither method.

In contrast to this, when the process of the provisional dither is performed using the associated data Dn' where the target pixel data Dn is multiplied with the coefficient k(Dn) shown in FIG. 4 (step S134), the ratio of the dots which are formed due to the process of the provisional dither is reduced as with a solid line J1 shown in FIG. 8. This reduction in the ratio of the dots which are formed due to the process of the provisional dither is the dots which are formed using the error diffusion method. For example, in a case where the gradation value of the target pixel data Dn is a value of 64, d1 in the diagram is the ratio of dots which are formed using the provisional dither and e1 is the ratio of the dots which are formed using error diffusion. Here, cases are possible where the pixel positions where the dots are formed using the error diffusion method coincidentally match with the pixel positions which are formed using the dither method. Even in these cases, the dots are counted as dots which are formed using the error diffusion method. The solid line J1 is equal to a line where the dashed line B1 is multiplied with the coefficient k(Dn) shown in FIG. 4, and it is possible to freely determine both ratios according to the value of the coefficient k(Dn) if the solid line J1 is in a range of not being greater than the dashed line B1. In line with the example in FIG. 4, since there are no dots which are formed using the dither method when the target pixel data Dn is a value of less than 16, a gradation value equal to or more than 0 and less than 16 is a region which is compatible with error diffusion. In addition, when the gradation value is equal to or more than 120, this is a dither compatible region since substantially all of the dots are basically formed using the dither mask 61. In addition, a section which is interposed between both regions is a region where the error diffusion and the dither are mixed. If the value of the coefficient k(Dn) is reduced, deviation from the linear relationship (J1) increases, and the ratio (d1/(d1+e1)) at which the dots are formed using the dither method is reduced. Here, the coefficient k(Dn) may be acquired by preparing a table as shown in FIG. 4 and carrying out a look up using the target pixel data Dn or may be calculated in the form of a function.

As a result, in determining using the dither as in, for example, fine lines, dots which correspond to the fine lines are formed using the error diffusion method even in a case where dots are not formed due to the relationship with the threshold and lines are broken or disappear. In other words, it is difficult for there to be problems such as the fine lines not being displayed or being interrupted due to the dither method. At this time, the halftone processes shown in FIG. 3 do not make any determination at all about whether the target of the process is a natural image such as a line diagram or a photograph. Accordingly, simply by carrying out the same halftone process (FIG. 3), it is possible to appropriately display a line drawing by using the error diffusion method to compensate for the dots which are lost in the process due to the dither method in a region which is a line drawing even when provisionally moving without any changes from a region which is a line diagram to a region which is a natural image or when a line drawing exists in a natural image. In addition, in medium and high gradation regions where there is no problem with reproducibility of line drawings, it is possible to generate dots according to the characteristics (for example, a blue noise characteristic) of the dither mask 61 using the dither method. As a result, it is possible to maintain sufficient image quality with little graininess deterioration in bidirectional printing even with a natural image.

In addition, according to the present embodiment, it is possible to easily set the ratio of the contribution of the dither method and the error diffusion method using the coefficient k(Dn). In the embodiment described above, the ratio for generating the dots where it is determined that the dots are to be formed using the process of the provisional dither (which is equivalent to the solid line J1 in FIG. 8) and the final ratio for generating the dots (which is equivalent to the dashed line B1 in FIG. 8) have a relationship of J1/B1=k(Dn). Accordingly, it is not necessary to perform a process, such as where feedback is given to the thresholds in the error diffusion method by actually measuring the ratios of the dots which are generated in the process of the provisional dither for each gradation value in order to optimize both ratios to desired values, a number of times until the desired result is obtained.

In the present embodiment, by comparing the associated data Dn', which is modified by multiplying the coefficient k(Dn) with the pixel data Dn, with the first threshold THn_D (step S134 in FIG. 3), the ratio for generating the dots according to the dither is controlled to have the characteristic shown by the solid line J1 in FIG. 8. Similar results may be obtained by modifying the first threshold THn_D rather than the pixel data Dn in the process of the provisional dither. In detail, determining in step 134 is modified to $$Dn \geq THn\_D'?$$

where THn_D'=THn_D/k(THn_D)
with 0<k(THn_d)≤1.0

By doing so, it is possible to reduce the ratio of the dots where it is determined that the dots are to be generated using the process of the provisional dither, and it is possible to obtain the same operational effects as the embodiment described above.

In the halftone process (step S130), the conversion calculation described above may be performed in advance for all of the thresholds in the dither mask 61 instead of calculating the first threshold, which is used in the process of the provisional dither (step S134), each time using the formula described above. By creating a modified dither mask where each of the thresholds THn_D in the dither mask 61 is replaced with a threshold THn_D', which is obtained using a conversion calculation and for which conversion is complete, and using the modified dither mask in determining in step S134, it is not necessary to calculate the threshold THn_D' for each pixel. In this case, it is possible to determine whether or not the thresholds of the dither mask are to be modified using the coefficient k(THn_d) by examining the ratio of the dots which are generated in practice by the process of the provisional dither. In detail, it is possible to find k(THn_D) by calculating the ratio for generating the dots where it is determined that the dots are to be formed using the process of the provisional dither (which is equivalent to the solid line J1 in FIG. 8) and the final ratio for generating the dots (which is equivalent to the dashed line B1 in FIG. 8) and calculating J1/B1=k(THn_d).

In the present embodiment, a fixed value (a value of 127 which is the central value of the gradation range) is used as the threshold THe which is used at the time of the error diffusion method, but it is possible to form an image while solving the problems such as trailing as described in Japanese Patent No. 3360391 if a value which increases according to the gradation value of the target pixel data is used. Furthermore, if a process of switching the error diffusion range shown in FIG. 7 is performed according to the gradation value of the target pixel data, it is possible to expect a further improvement in image quality. Since the method of performing the error diffusion while switching the diffusion range is a well-known technique, detailed description will be omitted, but when the error diffusion range is switched according to a combination of the input gradation value and the binarization result, it is possible to improve graininess of low gradation regions and suppress generation of continuous dots which are undesirable, so-called worms, by carrying out error diffusion in a wide range only when the dots are ON at a low gradation value.

Examples of the advantages of the substantial dither compatibility on the high gradation side include the point that it is possible to suppress deterioration in image quality due to, for example, deviation in dot landing positions. This advantage is due to the predetermined characteristics of the forming of dots using the dither mask 61 described above. Here, it is difficult for the graininess of the printing image quality to stand out due to bleeding of the ink and the graininess does not become a problem even when dot data is generated using the dither method in high gradation regions.

B. Second Embodiment

Figure 3:
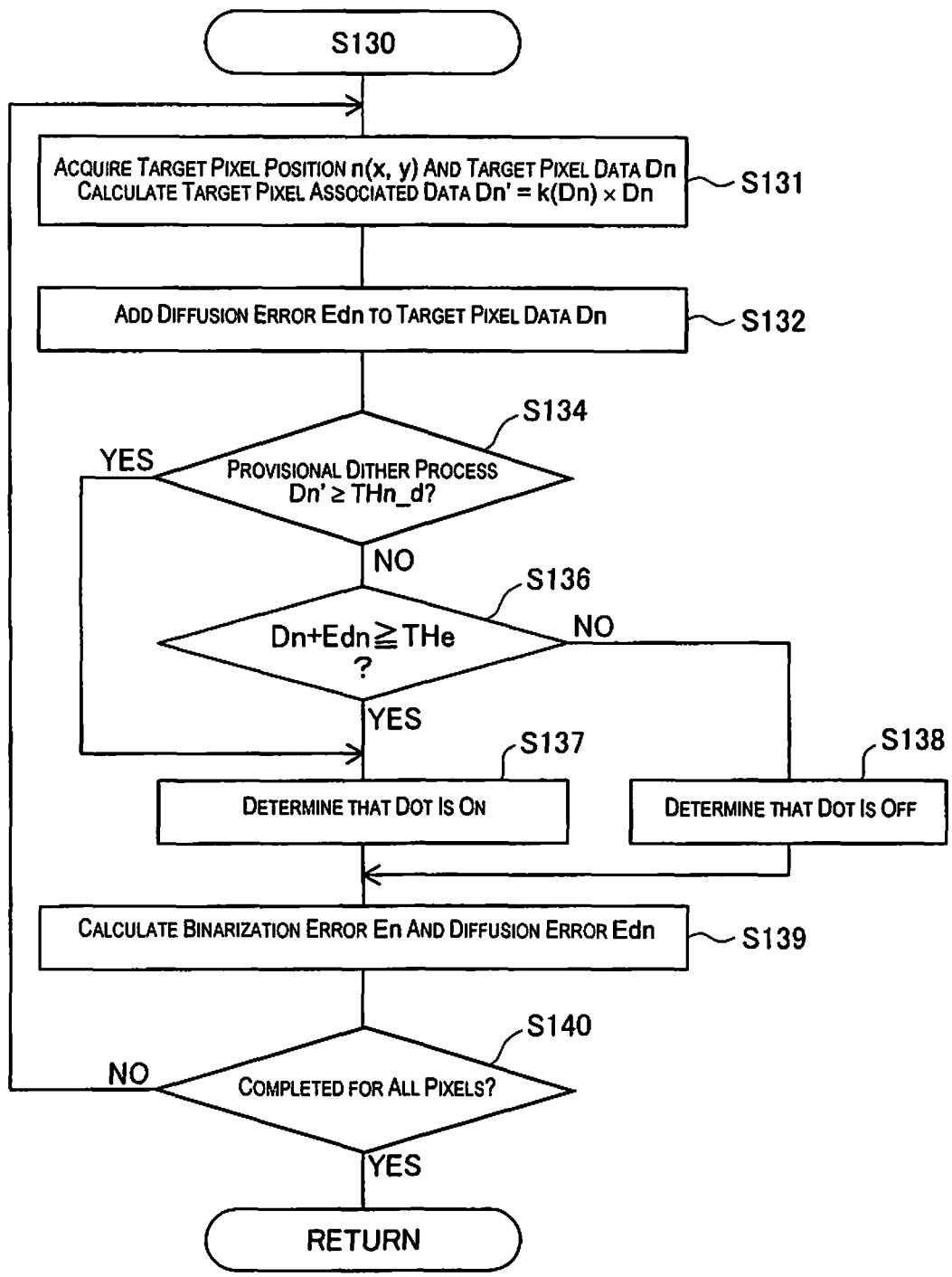
FIG. 3 is a flow chart illustrating a flow of a halftone process as a first embodiment.
Figure 9:
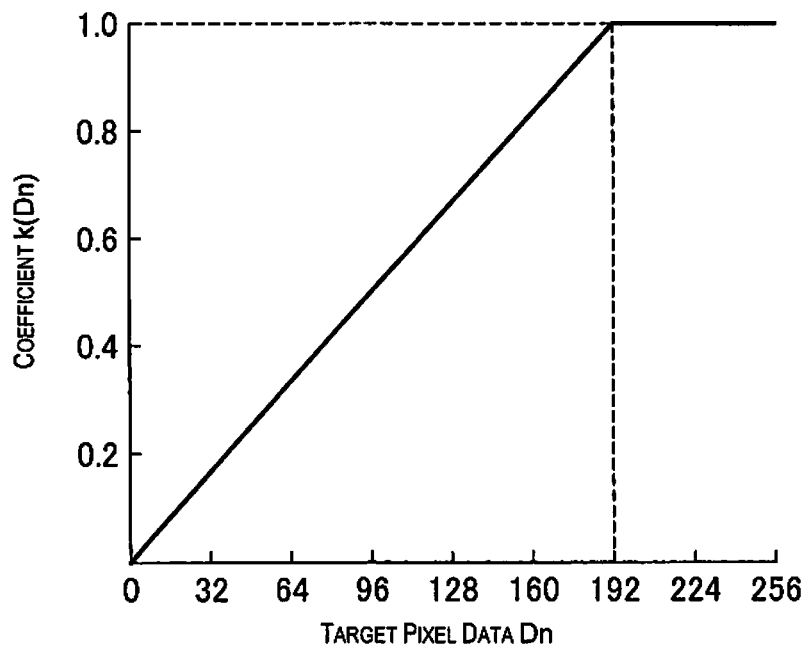
FIG. 9 is a graph illustrating a relationship between the target pixel data Dn and the coefficient k(Dn) in a second embodiment.

Next, a second embodiment of the present invention will be described. The printer 20 of the second embodiment is provided with the same hardware configuration as the first embodiment and executes the same printing process (FIG. 2) and the same halftone process (FIG. 3). The printer 20 of the second embodiment differs from the first embodiment in the form of the coefficient k(Dn) which is used in determining the associated data Dn'. FIG. 9 is a graph illustrating the coefficient k(Dn) which is used in the second embodiment.

In the second embodiment, the printer 20 performs the same processes as in the first embodiment (FIG. 2 and FIG. 3) and the value shown in FIG. 9 is used as the coefficient k(Dn) at this time instead of the value in FIG. 4. In the example shown in FIG. 9, the coefficient k(Dn) uniformly increases across a wider range (gradation values of 0 to 192) compared to the first embodiment. Since a value of 0 in the focus pixel data Dn is set as the first inflection point and a value of 192 is similarly set as the second inflection point in the first embodiment, it is possible to consider the second embodiment.

In the second embodiment, the switching from the state of error diffusion compatibility to the state of dither compatibility is performed more smoothly due to the point where the coefficient k(Dn) is switched being only the second inflection point, the ratio where the coefficient k(Dn) is uniformly increased being smaller than the first embodiment, and the like.

As shown in the first and second embodiments, it is possible to freely set the ratio of increase in the coefficient k(Dn). For example, the value of the coefficient k(Dn) at the first and second inflection points may be set so as to change smoothly rather than the coefficient k(Dn) being changed as a line graph. Alternatively, the coefficient k(Dn) may be set to change in a stepwise manner.

C. Third Embodiment

Figure 10:
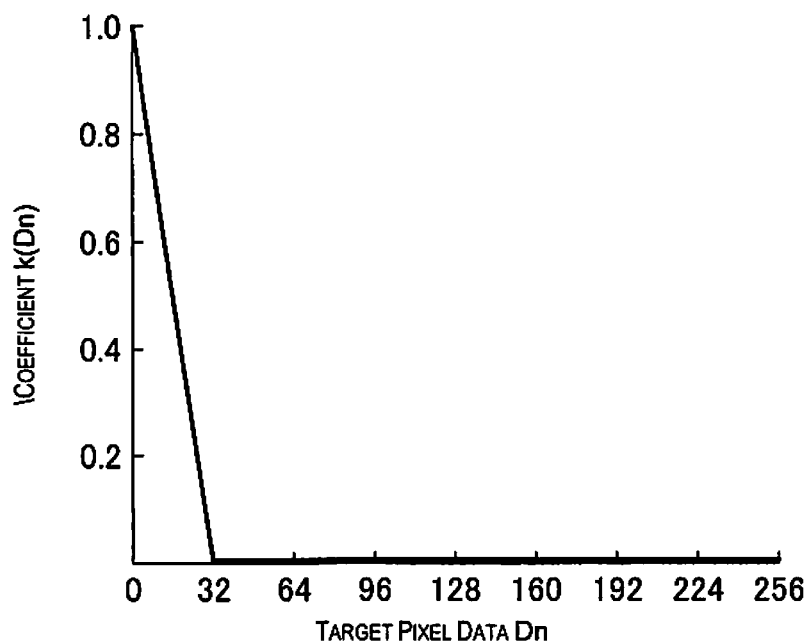
FIG. 10 is a graph illustrating a relationship between the target pixel data Dn and the coefficient k(Dn) in a third embodiment.

Next, a third embodiment of the present invention will be described. The printer 20 of the third embodiment is provided with the same hardware configuration as the first and second embodiments and executes the same printing process (FIG. 2) and the same halftone process (FIG. 3). The printer 20 of the third embodiment differs from the first embodiment in the form of the coefficient k(Dn) which is used in determining the associated data Dn'. FIG. 10 is a graph illustrating the coefficient k(Dn) which is used in the third embodiment.

In the third embodiment, the printer 20 performs the same processes as in the first embodiment (FIG. 2 and FIG. 3) and the value shown in FIG. 10 is used as the coefficient k(Dn) at this time instead of the value in FIG. 4. In the example shown in FIG. 10, the coefficient k(Dn) has substantially the opposite characteristics compared to the first embodiment. That is, when the target pixel data Dn is less than a value of 32, the coefficient k(Dn) gradually decreases from a value of 1.0 as the focus pixel data Dn increases from a value of 0. When the target pixel data Dn is equal to or more than a value of 32, the coefficient k(Dn) is a value of 0.

In the third embodiment, since the coefficient k(Dn) is a value of 0 when the target pixel data Dn is equal to or more than a value of 32, determining in the process of the provisional dither in step S134 is always "NO" when the gradation range is equal to or more than 32. Accordingly, ON/OFF of the dots is determined using the error diffusion method in this gradation range. In contrast to this, since the coefficient k(Dn) has a value which is not 0 when the target pixel data Dn is less than a value of 32, this gradation range is dither compatible when the target pixel data Dn is a range of being close to 0, and gradually switches from being dither compatible to being error diffusion compatible as the target pixel data Dn increases.

Accordingly, since the dots are formed using the dither method in a low gradation area, it is possible to eliminate the problems of trailing which occurs at the edges of regions where the gradation values significantly change, continuous dots which are undesirable (so-called worms), and the like by having the blue noise characteristic or the like in the dither mask. As a result, it is not necessary to employ a special scheme which involves increasing the complexity of the processes or decreasing the speed in the processes in the error diffusion method. As a result, it is possible to easily realize excellent image reproducibility using the error diffusion while preventing generating of trailing or worms in the low gradation areas.

As shown in the first to third embodiments, it is possible for the coefficient k(Dn) to be freely set by including increases and decreases. For example, it is possible to set the coefficient k(Dn) so that only a portion of the gradation range is set to be dither compatible (or error diffusion compatible) and the rest is set to be error diffusion compatible (dither compatible) and to smoothly switch between the two.

D. Modified Examples

D-1. Modified Example 1

In the first to third embodiments described above, the coefficient k is set as a function of the target pixel data Dn, but the coefficient k may be set to a constant value regardless of the target pixel data Dn. In this case, dots which are formed using the dither and dots which are formed using the error diffusion are formed at a ratio which is determined by the coefficient k regardless of the gradation value of the target pixel data Dn. In this case, in addition to making the coefficient k constant regardless of the target pixel data Dn, the coefficient k may be different values according to printing conditions. As the different printing conditions, it is possible to assume various conditions such as differences in the colors of the inks, differences in the inks to be used (colored inks, metallic inks, and the like), differences in the printing methods, and differences in the print media.

For example, different values may be used as the coefficient k for each color of the inks. For example, a large portion of dots may be formed using the dither method by setting the coefficient k to a value of 1 for yellow, and the ratio of dots which are formed using the error diffusion method may be increased by setting the coefficient k to a small value such as a value of 0.5 for cyan and magenta. In addition, the dots may be mainly formed using the error diffusion method with the coefficient k as a small value in a case of one-way printing, and the dots may be mainly formed using the dither method with the coefficient k as a large value in a case of bidirectional printing. In this case, when a dither mask is created such that each of the dots which are formed when moving forward and the dots which are formed when moving backward have the blue noise characteristic, the forming of images with little deterioration in the image quality is possible even when deviation occurs in the positions for forming dots in bidirectional printing. In the same manner, the value of the coefficient k may be made to be different when printing with a small number of passes and when printing with a large number of passes.

In modified example 1, the coefficient k is constant regardless of the target pixel data Dn or a value which is different according to other printing conditions, but in addition to the coefficient k being a function of the target pixel data Dn as shown in the first to third embodiments, the coefficient k may also be different functions or have different function ranges according to the printing conditions. By doing so, it is possible to carry out printing by appropriately setting the ratio of the dither compatibility and the error diffusion compatibility according to various conditions.

D-2. Modified Example 2

In the embodiments described above, a blue noise mask whose characteristics are similar to error diffusion is used as the dither mask, but a dot dispersion ordered dither which has a regular pattern such as a Bayer dither may be used. In this case, it is possible to solve the biggest problem of the Bayer dither that "there are cases where lines disappear" if the coefficient k(Dn) is a small value of less than 1.0 (a value of anywhere from 0 to 0.5) in low gradation regions as shown in the first and second embodiments. In addition, it is effective because it is possible to eliminate problems such as that the lines at the halftone pitch are intermittent even when using a dot concentration type of dither such as a halftone dot dither or a green noise mask. This is because it is possible to realize a halftone where it is possible to reproduce without fine lines disappearing or being broken by using the error diffusion method in the fine line sections while using the dither pattern such as a Bayer, halftone, a green noise mask, or the like for a normal section which has a two dimensional spread.

D-3. Modified Example 3

In the embodiments described above, the serial ink jet printer 20 is used as the printing apparatus, but the printing apparatus may be realized as another type of printer, for example, a page printer such as a line printer, or a laser printer. In addition, without being limited to a color printer, the printing apparatus may be realized as a printer for monochrome printing. Furthermore, without being limited to an ink jet printer, it is also possible to apply the present invention to various types of printers such as a thermal sublimation printer, a dot-impact printer, or the like.

In addition, it is also possible to apply the present invention to an image processing apparatus which performs only image processing. The halftone process which is exemplified in FIG. 3 and the like may be realized as a dedicated application program which is executed by a computer or may be realized in a dedicated apparatus such as an RiP. Alternatively, the present invention may be used by connecting a computer and a printer or a portion or all of the image processing may be executed within a printer driver. Furthermore, a dedicated server which performs image processing in this manner may be placed in a network and may be operated in a format where the image data is processed according to a request from another computer or a printer.

D-4. Modified Example 4

The associated data Dn' which corresponds to the target pixel data Dn may be set on the basis of various methods in addition to multiplying the target pixel data Dn with the coefficient k, such as to a value where a predetermined calculation operation is performed on the target pixel data Dn such as taking the square root of the target pixel data Dn or to a value where a predetermined value is subtracted from the target pixel data.

The present invention is not limited to the embodiments and modified examples described above, and it is possible for the present invention to be realized by various configurations within a scope which does not depart from the gist of the present invention. For example, it is possible for the technical features in the embodiments and modified examples which correspond to the technical features in each of the forms described in the section of the Summary of the Invention to be appropriately replaced or combined in order to solve some or all of the problems described above, or in order to achieve some or all of the effects described above. In addition, where the technical features are not described as essential in the present specification, it is possible to delete the technical features as appropriate.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing apparatus adapted to print an image based on image data, the printing apparatus comprising:
   an input section where the image data is input;
   a dot data generating section configured to generate dot data, which represents whether or not dots are formed, based on the image data; and
   a print section configured to perform printing of the image using the dot data which is generated,
   wherein the dot data generating section is configured
      to compare a first threshold which is aligned with a dither mask and a corresponding gradation value which corresponds with the image data which is input,
      to generate the dot data by determining that dots are to be formed in a case where it is determined that the corresponding gradation value exceeds the first threshold and to generate the dot data by determining the forming of dots due to application of an error diffusion method by comparing correction data, where error diffusion in the image data is complete, and a second threshold in a case where it is determined that the corresponding gradation value does not exceed the first threshold as a result of the comparing, and
      to diffuse errors, which occur as a result of generating the dot data, to pixels in a predetermined range in the vicinity in both of the cases.

2. The printing apparatus according to claim 1, wherein the corresponding gradation value is a value which is determined by multiplying the gradation value of the image data with a predetermined coefficient.

3. The printing apparatus according to claim 2, wherein the coefficient is determined according to the gradation value of the image data which is input.

4. The printing apparatus according to claim 3, wherein the coefficient is a value in the vicinity of 0 when the gradation value of the image data which is input is less than a first gradation value, gradually increases substantially according to the gradation value of the image data when the gradation value of the image data which is input is equal to or more than the first gradation value and less than the second gradation value, and is a value in the vicinity of 1.0 when the gradation value of the image data which is input is equal to or more than the second gradation value.

5. The printing apparatus according to claim 3, wherein the coefficient is a value in the vicinity of 1.0 when the gradation value of the image data which is input is less than a first gradation value, gradually decreases substantially according to the gradation value of the image data when the gradation value of the image data which is input is equal to or more than the first gradation value and less than the second gradation value, and is a value in the vicinity of 0 when the gradation value of the image data which is input is equal to or more than the second gradation value.

6. The printing apparatus according to claim 1, wherein an alignment of the thresholds in the dither mask is an alignment where a spatial frequency, with which the formed dots are provided, is a blue noise characteristic or a green noise characteristic.

7. The printing apparatus according to claim 1, wherein the gradation value is treated as the corresponding gradation value in the comparing by modifying the first threshold which is aligned with the dither mask.

8. A printing method, where an image is printed based on image data, comprising:
   inputting the image data;
   comparing a first threshold which is aligned with a dither mask and a corresponding gradation value which corresponds with the image data which is input when dot data, which represents whether or not dots are formed, is generated from the image data;
   generating the dot data by determining that dots are to be formed in a case where it is determined that the corresponding gradation value exceeds the first threshold and generating the dot data by determining the forming of dots due to application of an error diffusion method by comparing correction data, where error diffusion in the image data is complete, and a second threshold in a case where it is determined that the corresponding gradation value does not exceed the first threshold as a result of the comparing;
   diffusing errors, which occur as a result of generating the dot data, to pixels in a predetermined range in the vicinity in both of these cases; and
   performing printing of the image using the dot data which is generated.

9. A non-transitory computer readable medium having stored thereon a program, which is realized by a computer executing functions of printing an image based on image data comprising:
   inputting the image data;
   comparing a first threshold which is aligned with a dither mask and a corresponding gradation value which corresponds with the image data which is input when dot data, which represents whether or not dots are formed, is generated from the image data;
   generating the dot data by determining that dots are to be formed in a case where it is determined that the corresponding gradation value exceeds the first threshold and generating the dot data by determining the forming of dots due to application of an error diffusion method by comparing correction data, where error diffusion in the image data is complete, and a second threshold in a case where it is determined that the corresponding gradation value does not exceed the first threshold as a result of the comparing;
   diffusing errors, which occur as a result of generating the dot data, to pixels in a predetermined range in the vicinity in both of these cases; and
   performing printing of the image using the dot data which is generated.

10. An image data processing apparatus adapted to process image data, the image data processing apparatus comprising:
   an input section where the image data is input; and
   a dot data generating section configured to generate dot data, which represents whether or not dots are formed, from the image data which is input;
   wherein the dot data generating section is configured
      to compare a first threshold which is aligned with a dither mask and a corresponding gradation value which corresponds with the image data which is input,
      to generate the dot data by determining that dots are to be formed in a case where it is determined that the corresponding gradation value exceeds the first threshold and to generate the dot data by determining the forming of dots due to application of an error diffusion method by comparing correction data, where error diffusion in the image data is complete, and a second threshold in a case where it is determined that the corresponding gradation value does not exceed the first threshold as a result of the comparing, and to diffuse errors, which occur as a result of generating the dot data, to pixels in a predetermined range in the vicinity in both of these cases.

11. A printing apparatus adapted to print an image based on image data, the printing apparatus comprising:

an input section where the image data is input;

a first dot data generating section configured to generate dot data where whether or not dots are formed is provisionally determined by comparing each of thresholds in a dither mask where a plurality of thresholds are stored and a corresponding gradation value where the gradation value of the image data is multiplied with a predetermined coefficient;

a second dot data generating section configured to determine that dots are formed without any changes in a case where the provisional dot data shows a result where it is determined that dots are to be formed and determines whether or not dots are formed due to application of an error diffusion method to the image data in a case where the provisional dot data shows a result where it is determined that dots are not to be formed;

an error diffusion section configured to diffuse errors, which occur as a result of generating the dot data, to pixels in a predetermined range in the vicinity in a case where the dot data is generated according to either of the first or second dot data generation sections; and a printing section configured to perform printing of the image using the dot data which is generated.

* * * * *